(12) United States Patent
Waryas et al.

(10) Patent No.: US 6,725,198 B2
(45) Date of Patent: *Apr. 20, 2004

(54) SPEECH ANALYSIS SYSTEM AND METHOD (75) Inventors: Carol Waryas, San Antonio, TX (US); James H. Segapeli, Schertz, TX (US); Valarie Spiser-Albert, San Antonio, TX (US)

(73) Assignee: Harcourt Assessment, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/997,204

(22) Filed: Nov. 15, 2001

(65) Prior Publication Data

US 2002/0116183 A1 Aug. 22, 2002

Related U.S. Application Data (63) Continuation-in-part of application No. 09/769,776, filed on Jan. 25, 2001, and a continuation-in-part of application No. 09/770,093, filed on Jan. 25, 2001.

(51) Int. Cl.[7] .................. G10L 15/06; G10L 21/06; G09B 19/04; G09B 1/00
(52) U.S. Cl. ............... 704/254; 704/271; 704/276; 434/185; 434/167
(58) Field of Search .................. 704/276, 270, 704/258, 251, 246; 434/327, 322, 185, 157, 116

(56) References Cited

U.S. PATENT DOCUMENTS

| | | | |
|---|---|---|---|
| 4,615,680 A | * | 10/1986 | Tomatis ............ 434/157 |
| 4,969,194 A | | 11/1990 | Ezawa et al. |
| 5,142,657 A | * | 8/1992 | Ezawa et al. ........ 704/276 |
| 5,303,327 A | | 4/1994 | Sturner et al. |
| 5,393,236 A | | 2/1995 | Blackmer et al. |
| 5,487,671 A | | 1/1996 | Shpiro et al. |
| 5,562,453 A | | 10/1996 | Wen |
| 5,636,325 A | | 6/1997 | Farrett |
| 5,679,001 A | | 10/1997 | Russell et al. |
| 5,717,828 A | | 2/1998 | Rothenberg |
| 5,791,904 A | | 8/1998 | Russell et al. |
| 5,813,862 A | | 9/1998 | Merzenich et al. |

(List continued on next page.)

FOREIGN PATENT DOCUMENTS

| | | |
|---|---|---|
| EP | 0 360 909 | 4/1990 |
| EP | 0 504 927 | 9/1992 |
| EP | 1 089 246 | 4/2001 |
| WO | 99/13446 | 3/1999 |

OTHER PUBLICATIONS

Jackson, Peter, "Introduction to Expert Systems," 1999, Addison Wesley Longman Limited, 3rd Edition, pp. 207–210.*

(List continued on next page.)

Primary Examiner—Richemond Dorvil
Assistant Examiner—V. Paul Harper
(74) Attorney, Agent, or Firm—Allen, Dyer, Doppelt, Milbrath & Gilchrist, P.A.

(57) ABSTRACT

A system and method for analyzing a speech problem includes the steps of presenting a symbol representative of a word and prompting the user to pronounce the word represented by the symbol into an audio input device such as a microphone in signal communication with a processor. Next the therapist enters a phonetic representation of the user pronunciation into an operator input and storage device, the phonetic representation subsequently downloaded into the processor. It is then automatically determined whether an error exists in the user pronunciation. If an error exists, the error is automatically categorized.

27 Claims, 5 Drawing Sheets

U.S. PATENT DOCUMENTS

| | | | |
|---|---|---|---|
| 5,832,441 | A | 11/1998 | Aaron et al. |
| 5,857,173 | A | 1/1999 | Beard et al. |
| 5,865,626 | A | 2/1999 | Beattie et al. |
| 5,927,988 | A | 7/1999 | Jenkins et al. |
| 6,009,397 | A | 12/1999 | Siegel |
| 6,019,607 | A | 2/2000 | Jenkins et al. |
| 6,030,226 | A | 2/2000 | Hersh |
| 6,055,498 | A | 4/2000 | Neumeyer et al. |
| 6,071,123 | A | 6/2000 | Tallal et al. |
| 6,077,085 | A | 6/2000 | Parry et al. |
| 6,113,393 | A | 9/2000 | Neuhaus |
| 6,471,521 | B1 * | 10/2002 | Dornbush et al. ............ 318/48 |
| 6,356,943 | B2 * | 3/2003 | Murray et al. .............. 709/220 |

OTHER PUBLICATIONS

LocuTour Multimedia, Articulation: Therapy for Oral Apraxia, Dysarthria, and Developmental Speech Disorders, http://www.learningfundamentals.com/products/manuals/Artic_I_Cons_Phonemes.pdf.*

Parrot Software User's Manual "Automatic Articulation Analysis 2000," Parrot Software, Inc.*

Masterson, Julie and Pagan, Frank, "Interactive System for Phonological Analysis User's Guide," pps 41, Harcourt Brace & Compnay, San Antonio, 1993.

Long, Steven H. and Fey, Marc E., "Computerized Profiling User's Manual," pps 119, Harcourt Brace & Company, San Antonio, 1993.

American Speech–Language–Hearing Association, Technology 2000: Clinical Applications for Speech–Language Pathology, http://professional.asha.org/tech resources/tech2000/7.htm, pp. 1–7, 1996.

PictureGallery, http://www.psychcorp.com/catalogs/sla/sla014atpc.htm, pp. 1–2.

The Childes System, Child Language Data Exchange System, http://childes.psy.cmu.edu.

Additional Childes Tools, CHILDES Windows Tools, http://childes.psy.cmu.edu/html/wintools.html.

SAILS, the Speech Assessment & Interactive Learning System (SAILS™) Using SAILS in Clinical Assessment and Treatment, http://www.propeller.net/react/sails2.htm, pp. 1–3.

GFTA–2: Goldman–Fristoe Test of Articulation–2, http://www.agsnet.com/templates/productview p.asp?GroupID=a11750, pp. 1–3.

KLPA: Khan–Lewis Phonological Analysis, http://www.agsnet.com/templates/productview p.asp?GroupID=a1820, pp. 1–2.

Bernthal, John E., and Bankson, Nicholas W. (Eds.), *Articulation and Phonological Disorders,* Fourth Edition, Chapter 9, Instrumentation in Clinical Phonology, by Julie J. Masterson, Steven H. Long, and Eugene H. Buder, 1998, pp. 378–406.

* cited by examiner

SPEECH ANALYSIS SYSTEM AND METHOD

CROSS-REFERENCE TO RELATED APPLICATION

This application is a continuation-in-part of and claims priority to application Ser. No. 09/769,776, entitled "Speech Analysis and Therapy System and Method," filed Jan. 25, 2001, and application Ser. No. 09/770,093, entitled "Speech Therapy System and Method," filed Jan. 25, 2001, which are commonly owned with the instant application and which are incorporated herein by reference.

BACKGROUND OF THE INVENTION

1. Field of the Invention

The present invention relates to systems and methods for analyzing and remediating speech pathologies, and, more particularly, to such systems and methods that are computer-based.

2. Description of Related Art

Articulation and phonology disorders are the most common of the speech and language disorders. The prevalence of this disorder is, at the time of writing, approximately 10% of the school-age population. In addressing a perceived articulation issue in a student, speech/language pathologists have in the past used an initial test based upon a series of cards. Each card contains a picture and a word, and the student is asked to pronounce the word associated with the card. The pathologist then determines whether the student's pronunciation is "right" or "wrong." It may be recognized that such a system can be cumbersome, owing to the cards' having to be placed in a desired order and sorted manually.

An intervention system designed to automate this process, Picture Gallery I, was presented by the owner of the current application. In this system pictures and/or words stored in a database could be sorted using a desired criterion such as a particular phoneme and presented to the student under software control for facilitating the acquisition or remediation of speech or language skills. No analysis or scoring is performed; rather, the product is intended for use by one or more students, either alone or in concert with a pathologist/teacher.

A previously known method of diagnosing articulation or phonology disorders included a "pencil and paper" test wherein a student is asked to speak a word. The therapist grades the word subjectively, based upon the therapist's ear and the local standards.

Other systems known in the art that address speech/language analysis and therapy methodologies includes those of Neuhaus (U.S. Pat. No. 6,113,393), Parry et al. (U.S. Pat. No. 6,077,085), UCSF and Rutgers (U.S. Pat. Nos. 5,813,862 and 6,071,123), Neumeyer et al. (U.S. Pat. No. 6,055,498), Jenkins et al. (U.S. Pat. Nos. 5,927,988 and 6,019,607), Siegel (U.S. Pat. No. 6,009,397), Beard et al. (U.S. Pat. No. 5,857,173), Aaron et al. (U.S. Pat. No. 5,832,441), Russell et al. (U.S. Pat. Nos. 5,679,001 and 5,791,904), Rothenberg (U.S. Pat. No. 5,717,828), Wen (U.S. Pat. No. 5,562,453), Ezawa et al. (U.S. Pat. No. 4,969,194), Sturner et al. (U.S. Pat. No. 5,303,327), Shpiro (U.S. Pat. No. 5,766,015), and Siegel (U.S. Pat. No. 6,148,286). Commercial software products in the field of articulation, phonology, or speech sound production include Speech Viewer, Interactive System for Phonological Analysis, Speech Master, Visi-pitch, and Computerized Profiling. Commercial print products include the Goldman-Fristoe Test of Articulation (American Guidance Service), Khan-Lewis Test of Phonology (American Guidance Service), Photo Articulation Test (Pro-Ed), and Fisher-Logeman Test of Articulation (Pro-Ed).

SUMMARY OF THE INVENTION

It is therefore an object of the present invention to provide a system and method for eliciting a desired sound from a user.

It is a further object to provide such a system and method adapted to generate a report.

It is another object to provide a system and method for testing a user's articulation.

It is an additional object to provide such a system and method that is adapted to analyze a group of problematic sounds.

It is yet a further object to provide such a system and method that recommends a therapeutic program responsive to the analysis.

It is yet another object to provide such a system and method that includes a prescreening feature.

These and other objects are achieved by the present invention, a first aspect of which comprises a method and system for providing speech therapy. The method comprises the steps of selecting a problem speech sound and searching a database that comprises a plurality of records. Each record comprises a picture and a word associated with the word.

Next a set of records is automatically generated from the plurality of records. Each record contains a word specific to the problem speech's sound. The set of records is next automatically presented to a user sequentially on a display device, and the user is prompted to pronounce the displayed word. Finally, the pronunciation of each word is scored.

The system of the first aspect of the present invention comprises a processor, an input device in communication with the processor having means for selecting a problem speech sound, and a display device in communication with the processor. The database as described above is resident on the processor, as are software means. The software is adapted to automatically generate a set of records from the plurality of records, with each record containing a word specific to the problem speech sound. The software is also adapted to automatically present at least a portion of each record in the set of records to a user sequentially on a display device; the set of records to a user sequentially on the display device and to prompt the user to pronounce the displayed word. Finally, the software is adapted to receive via the input device a score for the pronunciation of each word.

Another aspect of the present invention is a system and method for analyzing a speech problem by performing a test of articulation, phonology, and sound features that is administered and analyzed with the use of an electronic processor. This method comprises the steps of presenting to a student/user a symbol representative of a word and prompting the user to pronounce the word represented by the symbol into a microphone in signal communication with a processor. Next the therapist enters a phonetic representation of the user pronunciation into the processor. It is then automatically determined whether an error exists in the user pronunciation. If an error exists, the error is automatically categorized.

In an alternate embodiment of the method, the therapist enters the phonetic representation of the user pronunciation into an input and storage device that is not in signal communication with the processor. At a later time the phonetic representation is downloaded into the processor, whereupon the automatic determining and categorizing steps proceed.

The system of the second aspect of the invention evaluates an articulation disorder. The system comprises a processor and an output device and an input device, each in signal communication with the processor.

Software installable on the processor is adapted to present on the output device, typically a display device, although this is not intended as a limitation, a symbol representative of a word. The software then is adapted to prompt a user via the output device to pronounce the word represented by the symbol and to receive from the therapist via the input device a phonetic representation of the user's pronunciation. The software automatically determines whether an error exists in the user pronunciation, and, if an error exists, automatically categorizes the error.

In the alternate embodiment the system comprises a processor and an output device and a user input device, each in signal communication with the processor. The system further comprises an operator input and storage device that is not in signal communication with the processor, but is connectable thereto for downloading operator-entered data thereinto, the data comprising the phonetic representation.

The software then receives downloaded data from the operator input and storage device the phonetic representation of the user's pronunciation. The software automatically determines whether an error exists in the user pronunciation, and, if an error exists, automatically categorizes the error.

The system and method of this second feature of the invention may be adapted for presentation of a single word, a plurality of words having a predetermined feature desired to be tested, a pretest for screening for potential articulation disorders, and an analysis of connected speech with the use of a moving picture to elicit a narrative from the student.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1A–5.

Figure 1A:
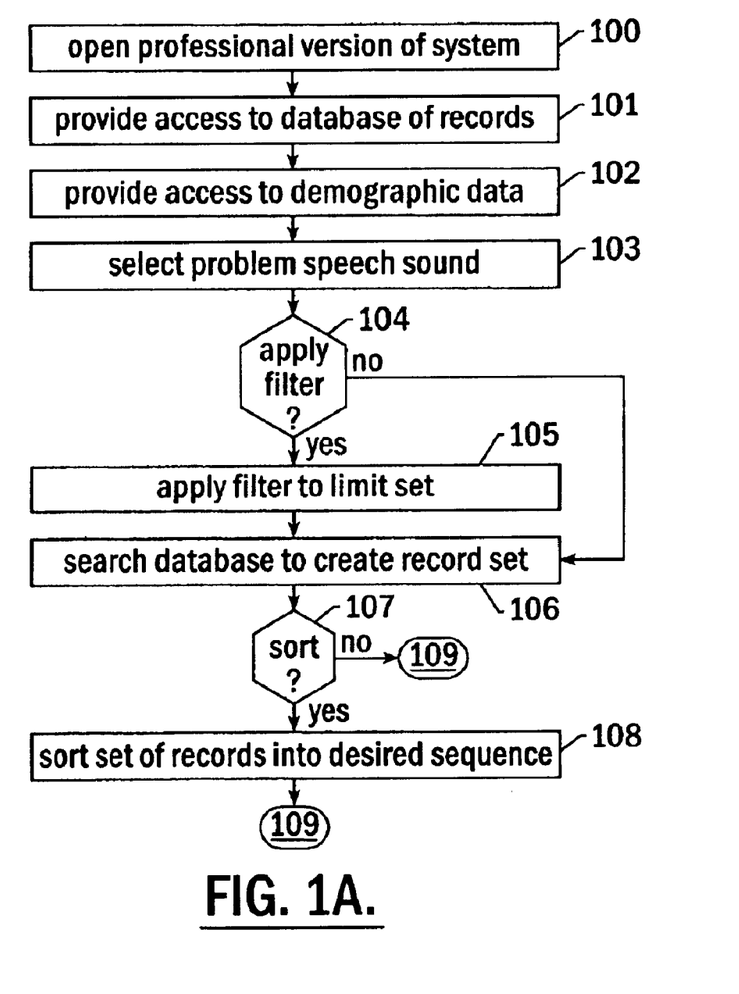
FIGS. 1A, 1B is a flow chart for an exemplary embodiment of the speech therapy method of the invention.
Figure 1B:
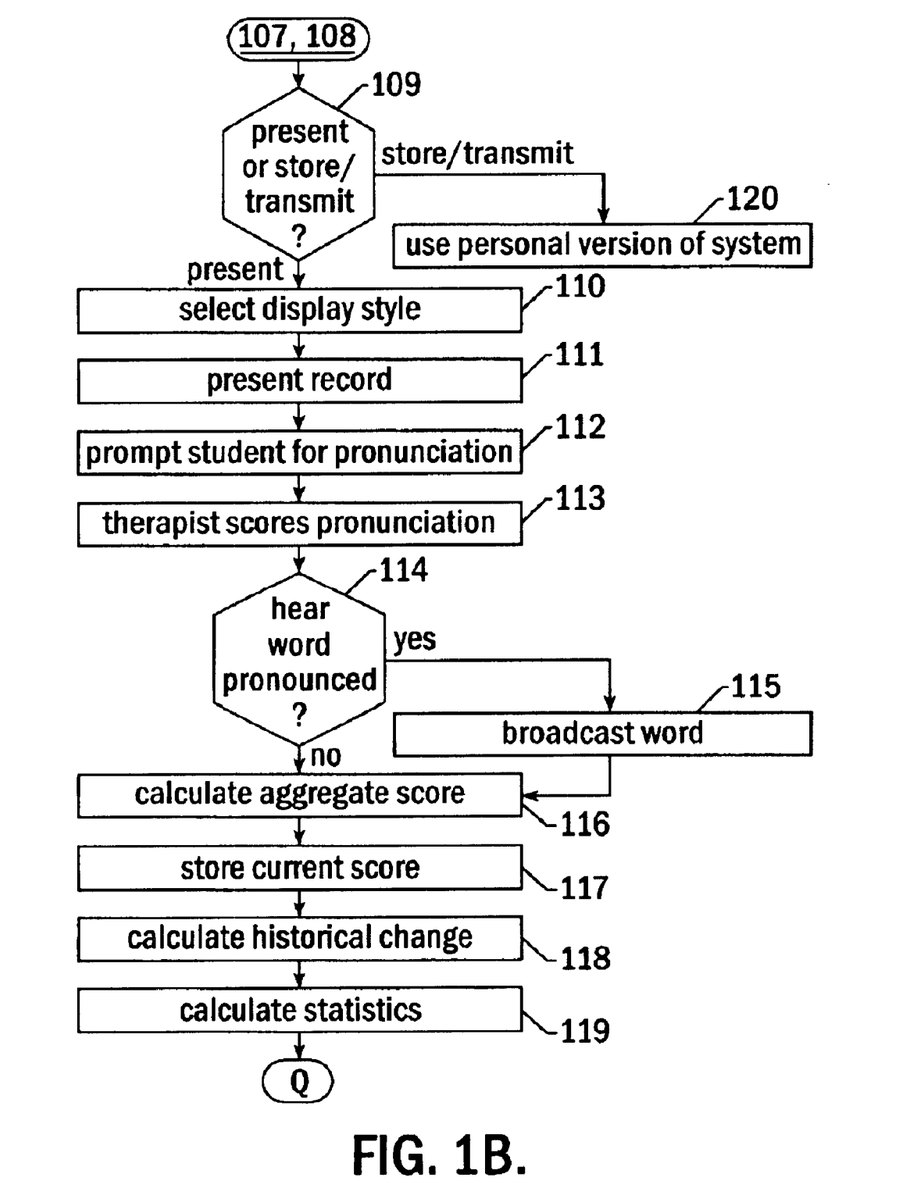
Figure 2:
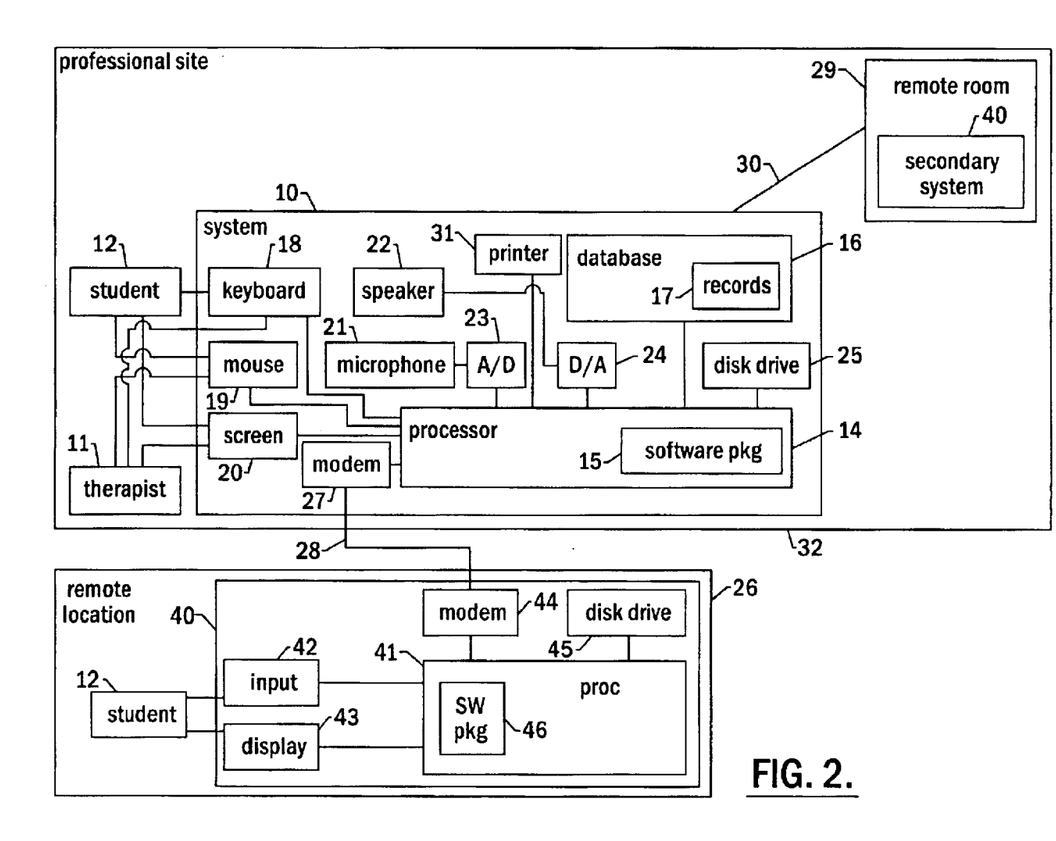
FIG. 2 is a schematic diagram of the speech therapy system.

A flow chart of an exemplary embodiment of the automated speech therapy/intervention method is given in FIGS. 1A, 1B, and a schematic of the system in FIG. 2. The system and method are also contemplated for use in the acquisition of a language skill as well as in a remediation setting. There are two versions of the system and method: In the "professional" version 10 of the invention (block 100), typically two people who will be referred to as "therapist" 11 and "student" 12 are present, although this is not intended as a limitation. This version is contemplated for use in such settings 32 as a hospital, clinic, rehabilitation center, school, or private facility. In the "personal" version 40 of the invention, the "student" 12 may be working alone, or in the presence of a nonprofessional such as a parent. The therapist 11 may be, for example, a speech therapist or a teacher; the student 12 may be a user who is learning a second language or a school attendee who is being tested for, or who is already known to have, an articulation problem or phonological disorder.

The method comprises the steps of providing access to an electronic database that includes a plurality of records (block 101). Each record comprises a word, a picture representative of the word, and a recommended pronunciation of the word. In an alternate embodiment, the record may also include a digitized video clip to represent motion or a verb to impart a concept of action. In another embodiment the record may further include a digitized sound that is associated with the word. For example, the record for the word dog might contain a picture of a dog, a video clip of a dog running, and/or a barking sound. It is believed that such multiple stimuli appeal to a multiplicity of cognitive areas, thereby optimizing the student's improvement.

Each record may further contain data useful for performing sorting functions, such as at least one category and/or concept. An exemplary set of categories comprises: animals, art, babies, celebrations, global images, environment, family, food, garden, health and exercise, home, leisure, medical, money, music, pets, play, school, shopping, signs/symbols, sports, technical, vacations, and work. An exemplary set of concepts comprises: activities, objects, places, people, ideas, and events. The record also typically comprises a vocabulary level associated with the word and a length of the word.

The method next comprises the step of inputting or accessing previously input demographic information for the student (block 102). Then a problem speech sound that is desired to be improved upon is selected that is known from a prior diagnosis (block 103).

The problem speech sound may be selected from a group consisting of a phoneme and a "feature." The feature comprises at least one of a place, a manner, and a voicing characteristic. Searching on a feature yields matches in all positions of words. The database is electronically searched (block 106) for records containing words that include the problem speech sound to generate a set of records. A filter may be applied if desired (block 104) to further limit the set (block 105), including selecting a category or concept, using the demographic information to limit the set, such as eliminating words that are intended for students over 7 years of age for a 5-year-old student, setting a desired vocabulary level, or selecting a word length.

If desired (block 107), the set of records may also be sorted (block 108) in various ways to produce a desired sequence, including, but not limited to, putting the words in alphabetical order, random order, or some other chosen sequence. In a preferred embodiment, all the words in the database contain at least one of the letters "r," "l," and "s," since these are known to present a problem most frequently.

For a professional therapy session, a decision may be made whether to present the set of records or store/transmit them (block 109). If the former, the set of records is next presented sequentially to the student in the predetermined sequence on a display device (block 111), and the student is prompted to pronounce the word (block 112). The display style may be selected (block 110) from a word only, a picture only, or a word plus a picture.

If the student can read, he or she can use the displayed word to form a pronunciation; if the student cannot yet read, or cannot read the currently presented language, the picture will also aid in acquisition of reading skills as well as pronunciation.

In the professional setting, the therapist scores the student's pronunciation (block 113) by inputting, for example, "correct," "incorrect," "skip," or "re-present," which will record an indication to re-present the record at a later time, such as after all the other items in the set have been presented. The student or therapist can also elect (block 114) to hear the word pronounced (block 115) in a recommended manner by making an appropriate selection on an input device.

The scores are received by the system, and an aggregate score is calculated (block 116) for the problem speech sound. The database also comprises a historical record of all sessions for each of the students, and the database is then accessed to store the current score thereinto (block 117). The therapist may choose to calculate a historical change (block 118) from previously saved scores to provide an indication of the student's progress. Such scores may also be used to calculate statistics (block 119) for a group of students, using, for example, a demographic filter.

The "personal version" of the system and method does not accept scoring, nor is there a database from which sets of records may be created. Rather, the professional version is adapted to download a selected set of records onto a storage medium, such as a diskette, or to transmit the set of records to a remote site (block 109). Such a remote site may comprise, but is not intended to be limited to, a room remote from the main processor accessible via intranet, or a different building accessible via internet. This version then enables the student to perform (block 120) the steps in blocks 110–112 and 115 as desired on his or her own.

The system 10, as schematically illustrated in FIG. 2, comprises a processor 14, on which are resident the software package 15 of the present invention adapted to perform the functions as outlined above and a database 16 comprising the plurality of records 17 and demographic and historical data on the users 12. An input device is in communication with the processor 14 that has means for selecting a problem speech sound. Such means may comprise any of the devices known in the art such as a keyboard 18 or pointing device such as a mouse 19 or touch screen. A display device such as a display screen 20 is also in communication with the processor 14.

Optional elements that are also in communication with the processor 14 may include a microphone 21 and a speaker 22, both under processor 14 control, as well as means for performing analog-to-digital 23 and digital-to-analog 24 conversions. The system 10 also has means for transferring records from the database to a storage medium such as a disk drive 25, under control of the software 15, or to a remote site such as another location 26 via a modem 27 over the internet 28 or such as another room 29 at the same location via an intranet 30. A printer 31 under processor control may also be provided for furnishing a hard copy of any portion of the session as desired.

A secondary system 40 for use of the personal version of the invention at the remote location 26, 29 comprises a processor 41, input device 42 and display device 43 in communication with the processor 41, and either or both of a modem 44 for receiving a set of records and a storage device reader 45 for reading a stored set of records. The software package 46 for this version is adapted to read the records, present them to the student 12 sequentially, and prompt the student 12 to pronounce the word associated with the record.

Figure 3A:
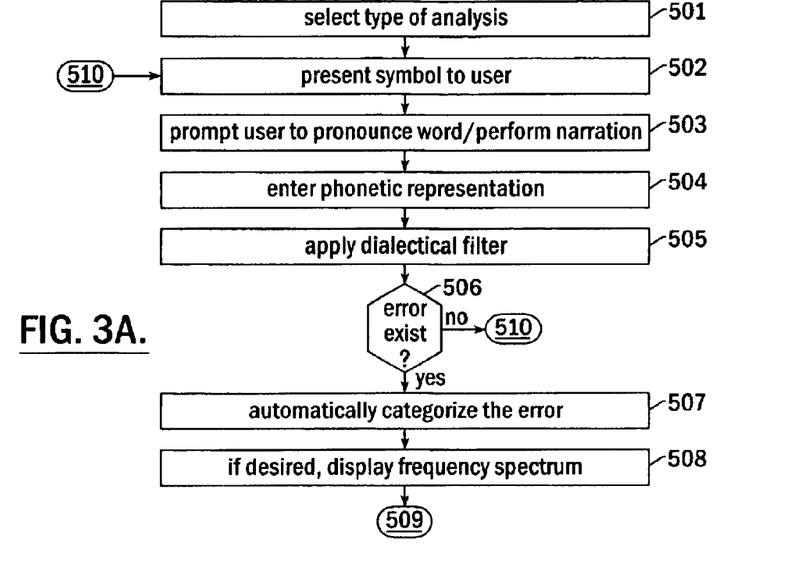
FIGS. 3A, 3B is a flow chart for an exemplary embodiment of the speech analysis method of the invention.
Figure 3B:
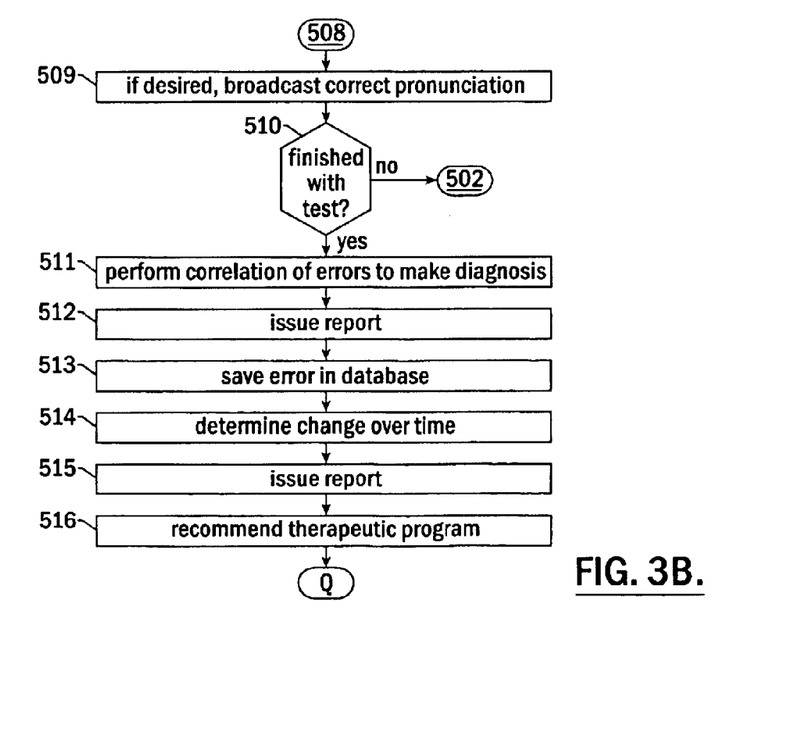

A flow chart of an exemplary embodiment of the automated speech therapy/intervention method is given in FIGS. 3A, 3B. The schematic of the system is substantially the same as that in FIG. 2. The method comprises the steps of selecting the type of evaluation desired to be performed (block 501): screening, single word analysis, "deep" test, or connected speech analysis. The screening, or pre-evaluation, comprises the steps of presenting to a user a symbol representative of a word (block 502) and prompting the user to pronounce the word represented by the symbol into a microphone in signal communication with a processor (block 503). The symbol presentation may comprise, for example, a picture on a display screen, although this is not intended as a limitation. The therapist then enters a phonetic representation of the user pronunciation into the processor (block 504).

Figure 4:
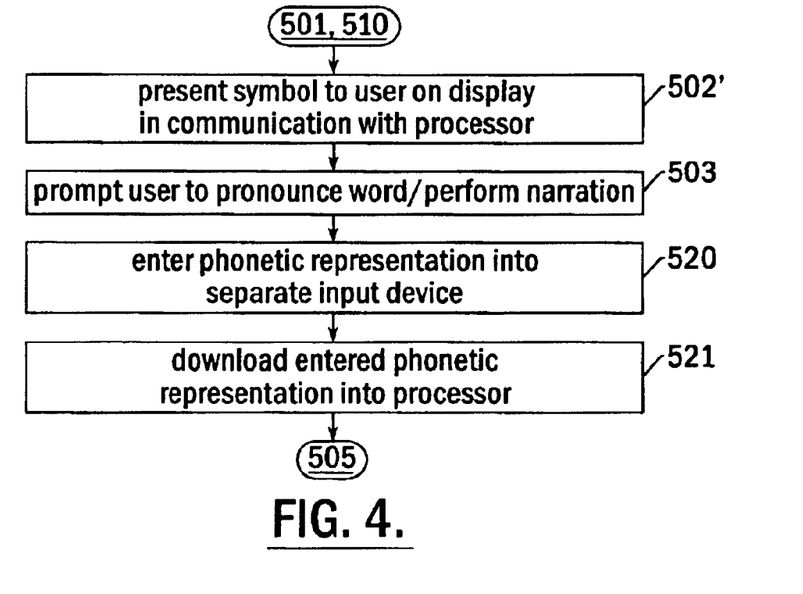
FIG. 4 is a section of a flow chart for another embodiment of the speech analysis method of the invention.
Figure 5:
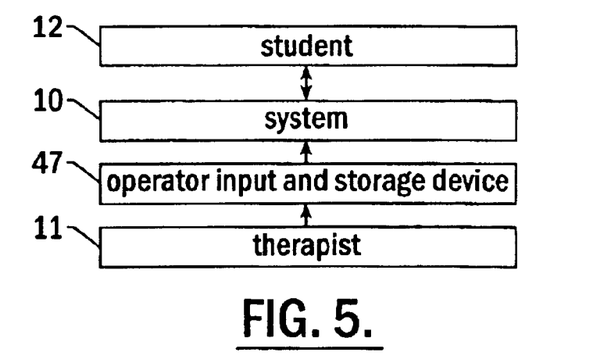
FIG. 5 is a schematic diagram of an alternate embodiment of the speech analysis system.

In an alternate embodiment of the method, the altered portion of which is illustrated in FIG. 4, the therapist enters the phonetic representation of the user pronunciation into a separate operator input and storage device 47, such as, but not intended to be limited to, a personal data assistant (block 520). At a later time, the user pronunciation data are downloaded into the processor (block 521) to complete the steps of the method.

A schematic of the system (FIG. 5) illustrates the addition of the operator input and storage device 47, which is connectable to the system 10 when desired for downloading data into the processor 14 that has been entered thereinto by the therapist 11.

The advantages of this embodiment include the user and the operator being able to use separate pieces of hardware, thereby eliminating physical restraints imposed by attempting to share equipment. Further, during the session the user cannot view the operator's scoring information, which may inhibit the user. In addition, the operator's hardware may retain data for downloading into more than one processor if desired for subsequent collection and analysis.

In both embodiments, the software installed upon the processor then automatically determines whether an error exists in the user pronunciation (block 506). The determination may additionally include the application of a dialectical filter (block 505) that is adapted to discriminate between that which is deemed to be a true error and a predetermined normal dialect word pronunciation. If an error exists, the software automatically categorizes the error (block 507). An error may be, for example, a substitution, a mispronunciation, or an omission. These steps are repeated a predetermined number of times n, for example, 20 times (block 510).

It may then be desired to perform the "deep test," which may be performed with the knowledge gained from a pre-evaluation as above or de novo. If the pre-evaluation has been performed, the software automatically generates a set of symbols, wherein each symbol is representative of a word containing at least one of the errors determined in the pre-evaluation. Then the steps as above are performed using the generated set of symbols, and an evaluation is made of articulation errors for the whole set.

If a single word is desired to be analyzed for, the steps in blocks 502–509 are performed once for the desired word.

Once a word has been pronounced and the phonetic representation entered into the processor, the therapist may decide to display a frequency spectrum of the user's pronunciation (block 508). If desired, a sample of a correct pronunciation of the word may be broadcast via a speaker in signal communication with the processor (block 509).

When a plurality of words have been tested, the evaluating step also comprises automatically recognizing an underlying commonality by correlating the errors detected. This pattern recognition permits the software to achieve an overarching diagnosis of a problem speech sound (block 511).

Following the error categorization, if desired, a report can be issued detailing the user's error(s) (block 512). Additionally, the error may be saved in a database that is accessible by the processor (block 513). If a previous entry for this user already exists, which is determined by a search, the error found in the present test may be compared with an error previously found, and a change overtime determined for that user (block 514), to note whether an improvement has occurred. Again, if desired, a report may be issued (block 515) as to the change determined.

An additional feature of this invention is the ability, once a categorization has been made of an error, of recommending a therapeutic program to address the error (block 516). Such a recommendation formulation may comprise, for example, creating a set of records as detailed above in FIGS. 1A–2.

If connected speech analysis is desired to be performed, the "symbol" comprises a motion picture representative of an action, and the user is prompted to provide a narration on the action into a microphone in signal communication with a processor. The therapist then enters a phonetic representation of the user's pronunciation of the narration into the processor. Software resident in the processor automatically determines whether an error exists in the user pronunciation, and, if an error exists, automatically categorizes the error.

It may be appreciated by one skilled in the art that additional embodiments may be contemplated, including alternate forms of presentation of the symbols and sounds.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for evaluating an articulation disorder comprising the steps of:

presenting to a user a symbol representative of a word;

prompting the user to pronounce the word represented by the symbol into a microphone in signal communication with a processor;

entering a phonetic representation of the user pronunciation of the word into an input and storage device not in signal communication with the processor;

transferring the phonetic representation from the input and storage device to the processor;

automatically determining whether an error exists in the user pronunciation; and if an error exists, automatically categorizing the error.

2. The method recited in claim 1, further comprising the step, following the prompting step, of displaying a frequency spectrum of the user pronunciation.

3. The method recited in claim 1, further comprising the step, following the prompting step, of broadcasting a sample of a correct pronunciation of the word.

4. The method recited in claim 1, further comprising the step of issuing a report on an error in user pronunciation.

5. The method recited in claim 1, further comprising the steps of:

saving the error in a database accessible by the processor;

searching the database to determine whether a previous entry for the user exists; and if a previous entry exists, comparing the error with an error in the previous entry and determining a change with time.

6. The method recited in claim 5, further comprising the step of issuing a report on the determined change.

7. The method recited in claim 1, further comprising the step, if an error exists, of recommending a therapeutic program to address the error.

8. The method recited in claim 7, wherein the program recommending step comprises the steps of:

searching a database comprising a plurality of records, each record comprising a picture and a word associated therewith; and automatically generating a set of records from the plurality of records, each record containing a word containing a problem speech sound representative of the error, the set of records for subsequent display and pronunciation by the user.

9. The method recited in claim 1, wherein the presenting step comprises displaying a picture on a display screen.

10. The method recited in claim 1, wherein the error is selected from a group consisting of a substitution, a mispronunciation, and an omission.

11. The method recited in claim 1, wherein the determining step comprises applying a dialectical filter adapted to discriminate between an error and a predetermined normal dialect word pronunciation.

12. A method for evaluating an articulation disorder comprising the steps of:

performing a pre-evaluation comprising the steps of:

(a) presenting to a user a symbol representative of a word;

(b) prompting the user to pronounce the word represented by the symbol into a microphone in signal communication with a processor;

(c) entering a phonetic representation of the user pronunciation of the word into an input and storage device not in signal communication with the processor;

(d) transferring the phonetic representation to the processor;

(e) automatically determining whether an error exists in the user pronunciation; and (f) if an error exists, automatically categorizing the error; repeating steps (a)–(f) a predetermined number of times;

automatically generating a set of symbols, each symbol representative of a word containing at least one of the errors determined in the pre-evaluation; and performing an evaluation comprising performing steps (a)–(f) using the generated set of symbols.

13. The method recited in claim 12, further comprising automatically generating a report summarizing the errors detected in the evaluation performing step.

14. The method recited in claim 12, wherein the evaluation performing step comprises automatically recognizing an underlying commonality in the errors to achieve a diagnosis of a problem speech sound.

15. The method recited in claim 14, further comprising the step of recommending a therapeutic program to address the diagnosed problem speech sound.

16. A method for evaluating an articulation disorder comprising the steps of:
  (a) presenting to a user a symbol representative of a word;
  (b) prompting the user to pronounce the word represented by the symbol into a microphone in signal communication with a processor;
  (c) entering a phonetic representation of the user pronunciation of the word into an input and storage device not in signal communication with the processor;
  (d) transferring the phonetic representation from the input and storage device to the processor;
  (e) automatically determining whether an error exists in the user pronunciation;
  (f) if an error exists, automatically categorizing the error; repeating steps (a)–(f) a predetermined number of times; and
  correlating the categorized errors to determine an existence of an articulation disorder.

17. A method for evaluating an articulation disorder comprising the steps of:
  presenting to a user a motion picture representative of an action;
  prompting the user to provide a narration on the action into a microphone in signal communication with a processor;
  entering a phonetic representation of the user pronunciation of the narration into an input and storage device not in signal communication with the processor;
  transferring the phonetic representation to the processor;
  automatically determining whether an error exists in the user pronunciation; and
  if an error exists, automatically categorizing the error.

18. A system for evaluating an articulation disorder comprising:
  a processor:
  an output device and a user input device in signal communication with the processor;
  an operator input and storage device having means for receiving and storing data and connectable with the processor for downloading data thereinto;
  software means installable on the processor adapted to:
    present on the output device a symbol representative of a word;
    prompt a user via the output device to pronounce the word represented by the symbol into the user input device;
    receive from the input and storage device a phonetic representation of the user pronunciation entered thereinto by the operator and downloaded into the processor;
    automatically determine whether an error exists in the user pronunciation; and
    if an error exists, automatically categorize the error.

19. The system recited in claim 18, wherein the display device comprises at least one of a printer and a display screen, the user input device comprises a microphone, and the input and storage device comprises at least one of a keyboard and a pointing device.

20. The system recited in claim 18, wherein the software means is further adapted to display on the display device a frequency spectrum of the user pronunciation.

21. The system recited in claim 18, further comprising broadcasting means in signal communication with the processor and wherein the software means is further adapted to direct a sample of a correct pronunciation of the word to be broadcast via the broadcast means.

22. The system recited in claim 21, wherein the broadcasting means comprises an audio speaker.

23. The system recited in claim 18, wherein the software means is further adapted to issue a report on an error in user pronunciation via the display device.

24. The system recited in claim 18, wherein the software means is further adapted, if an error exists, to recommend a therapeutic program to address the error.

25. The system recited in claim 24, further comprising a database resident on the processor comprising a plurality of records, each record comprising a picture and a word associated therewith; and
  wherein the software means is further adapted to automatically generate a set of records from the plurality of records, each record containing a word containing a problem speech sound representative of the error, the set of records for subsequent display and pronunciation by the user.

26. The system recited in claim 18, wherein the symbol comprises a picture and the output device comprises a display screen.

27. The system recited in claim 18, wherein the output device comprises a display screen, and wherein the software is adapted to direct a presentation of a motion picture representative of an action on the display screen.

* * * * *